May 31, 1927.  
G. E. HAZARD  
1,631,031  
UNLOADER ASSEMBLY  
Filed Sept. 22, 1925  
3 Sheets-Sheet 3

Inventor  
G. E. Hazard,  
By A. S. Pattison  
Attorneys

Patented May 31, 1927.

1,631,031

UNITED STATES PATENT OFFICE.

GEORGE EDGAR HAZARD, OF ROCHESTER, NEW YORK, ASSIGNOR TO KELLOGG MANUFACTURING CO., OF ROCHESTER, NEW YORK.

UNLOADER ASSEMBLY.

Application filed September 22, 1925. Serial No. 57,840.

This invention relates to an unloader assembly and pertains more particularly to an automatically operated unloader assembly for use with air compressors being mounted or positioned in the air line intermediate the compressor and a storage tank for controlling automatically the pressure in the storage tank.

The object of the present invention is the provision of a novel construction of unloader unit.

Another object of the invention is the provision of an unloader unit of novel construction for automatically controlling the air pressure in a storage tank.

A still further object of the invention is the provision of an unloading unit comprising a check valve, an automatic unloader, and a safety valve.

Another and further object of the invention is the provision of an automatic unloading unit comprising a check valve, an automatic unloader and a safety valve built into a unit whereby they function in conjunction with one another.

A still further object of the invention is the provision of an automatic unloading unit which performs the function of controlling the air pressure in the storage tank, acting as a check valve between a compressor and the storage tank, and having a safety valve to protect the storage tank and the compressor against the building up of an excessive air pressure.

A still further object of the invention is the provision of an automatic unloading unit having novel features of construction and improved results which will be pointed out in the following description.

Another object of the invention is the provision of an automatic unloading unit for controlling the air pressure in a storage tank and for unloading the compressor so that when the same starts to compress it will start against zero pressure.

In the drawings:—

Fig. 3 is a detail vertical sectional view of the unloader.

Fig. 4 is a horizontal sectional view taken on the line 4—4 of Fig. 1, looking in the direction indicated by arrow.

Figure 1:
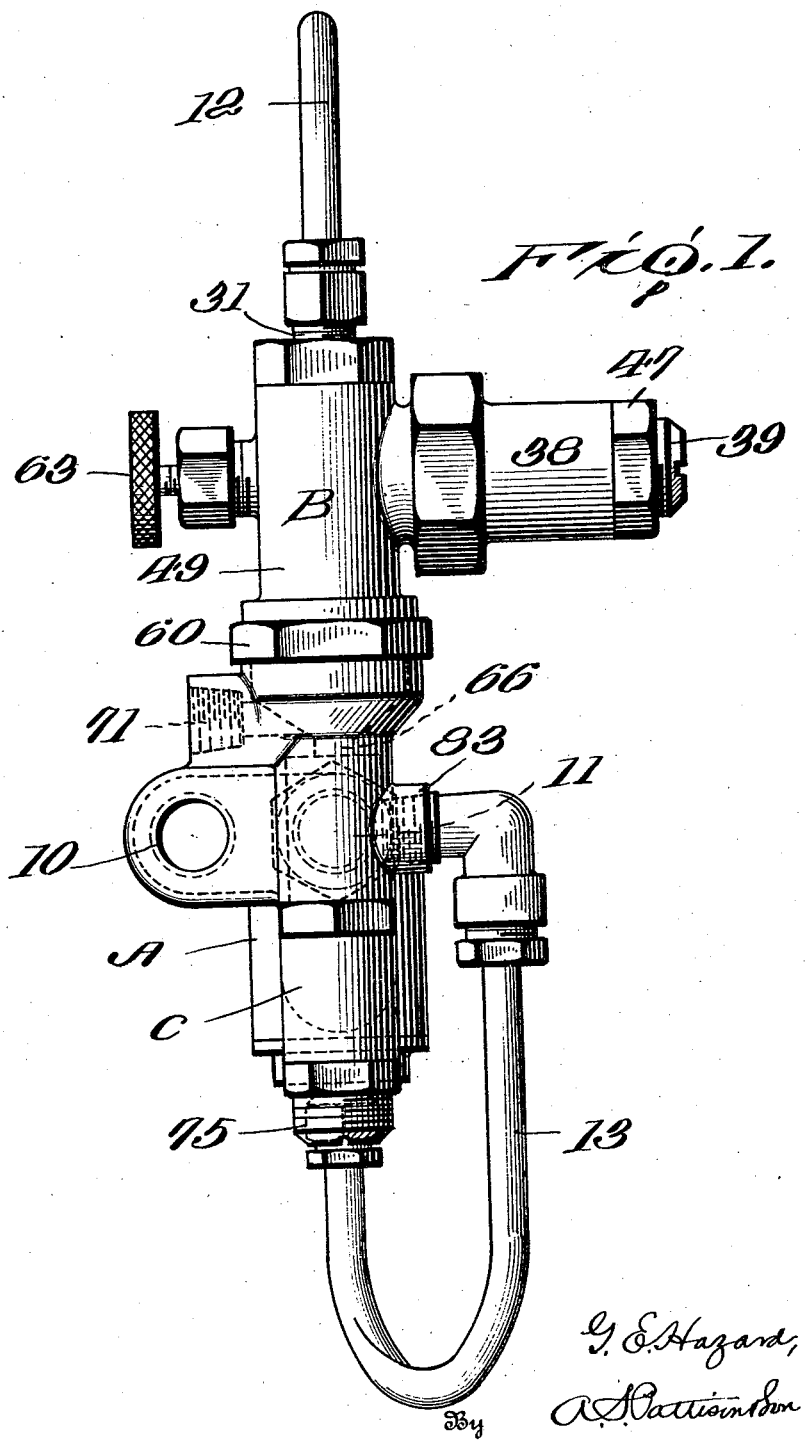
Figure 1 is a view in elevation of the unloading unit.

The present invention is an unloading unit which has been developed and is primarily for use in the air line between a compressor, which is continuously operated, and the air storage tank. The purpose of the device is to protect the compressor and the storage tank so as to prevent the bulding up of an excessive air pressure which would result in the blowing up of the storage tank.

A device of this character is of value in many uses of air compressors, one for instance being that of very large passenger bus of the automobile type which is provided with air brakes. The compressors for building up the air pressure in the storage tank for vehicles of this type is generally driven from the automobile motor and is in operation continuously and for this reason an automatic unloader for the storage tank is absolutely essential to prevent the compressor building up an excessive air pressure which would result in the blowing up of the tank.

Additionally the present unit is constructed to provide a check valve, between the compressor and the storage tank, to prevent the escape of the air pressure after it has been placed in the storage tank and the unit also comprises a safety valve to protect both the compressor and the storage tank in the event that the automatic unloader should not operate for any reason.

The check valve is of a particular construction so that the air delivered from the compressor to the storage tank is screened to prevent dirt and any other foreign matter being discharged in the storage tank which of course would be undesirable for many reasons.

The unloading unit is also constructed so that in its operation the unloader when it operates will cause the pressure between the check valve and the compressor to drop to zero so that when the compressor begins to deliver air to be delivered to the storage tank the compressor starts its work against zero pressure.

Describing the invention in broad terms, it will be seen by referring to the drawings in which like parts are designated by similar reference numerals throughout the description, that the unit comprises a check valve A, an automatic unloader B and a safety valve C. The check valve A has a supplemental pressure chamber D which is interposed between the unloader and the safety valve.

Describing the invention in detail it will be seen that the check valve has an air inlet 10 to which is delivered the air from the compressor (not shown) and an air outlet 11 which is in communication by a suitable pipe or otherwise with the storage tank (not shown). The check valve is in communication with the unloader by means of a pipe 12. The check valve is additionally in communication with the pressure chamber D by means of a pipe 13.

Describing the check valve in detail this member is a housing having the inlet 10 and the outlet 11. The housing is formed to provide a lower chamber 14 in the bottom of which is a screw plug 15 the upper end of which extends into a seat 16. The plug 15 is provided centrally with a horizontal opening 17 which has leading off from it a vertical opening or passageway 18.

The pipe 13, which joins the check valve A and the pressure chamber D has its end 21 in the plug 15. The end 21 of this pipe is provided with openings 22 which are in communication with the radial openings 23 in the plug 15 which are in communication at their inner ends with the chamber 14.

The check valve A has an upper chamber 24 in which there is a floating plunger 25 provided at its lower end with an enlarged head 26. The lower end of the chamber 24 is provided with an orifice or opening 27 which is in communication with the seat 16 and therefore likewise in communication with the upper end of the vertical channel 18 of the check valve plug 15. Leading off from the chamber 24 is the check valve outlet 11.

Figure 2:
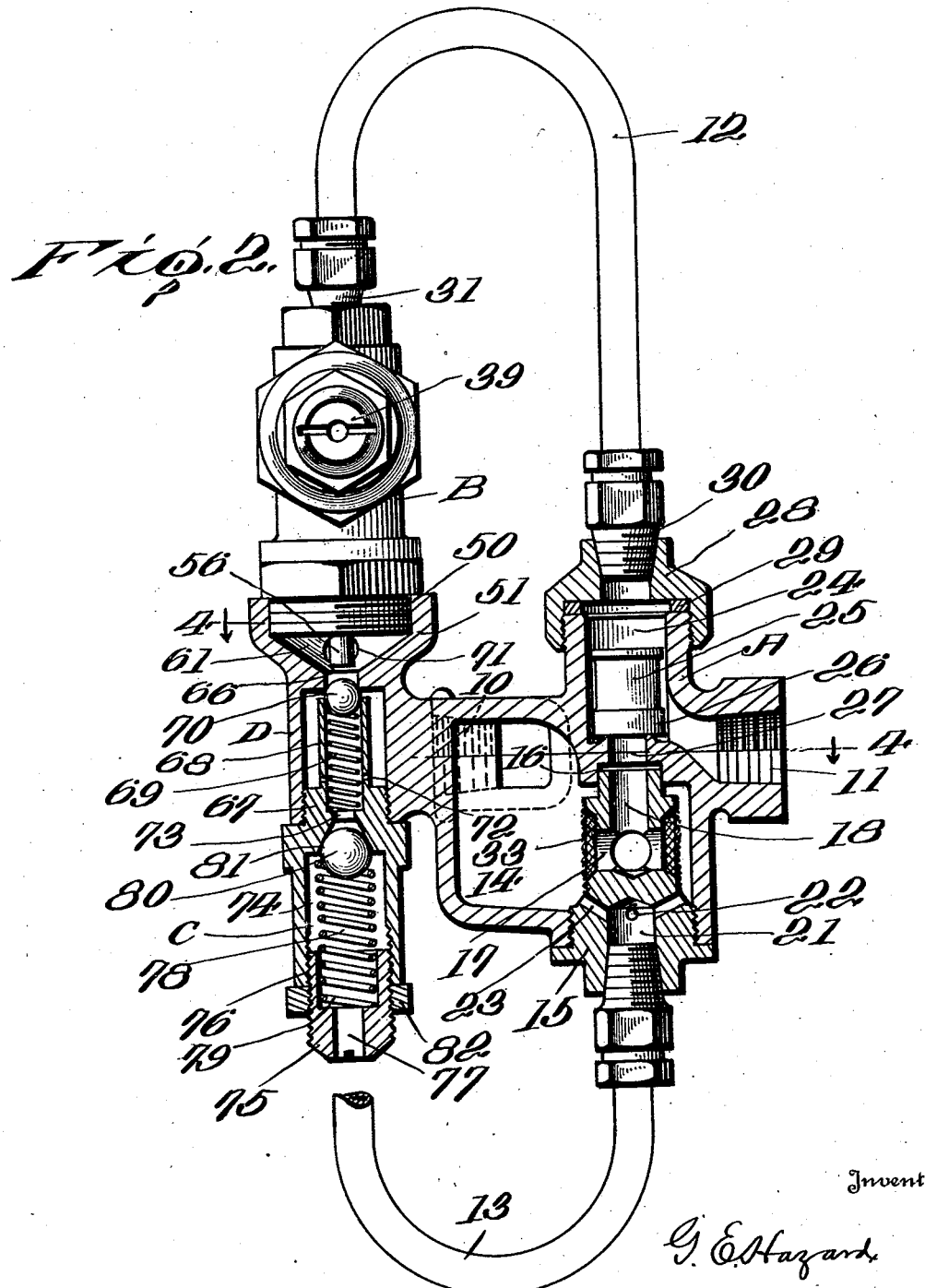
Fig. 2 is a vertical sectional view through the unloading unit, the unloader being shown in full line.

The plunger 25 is normally in the position shown in Figure 2 of the drawings and when in this position closes the opening 27.

The upper end of the check valve upper chamber 24 is provided with a suitable screw fitting 28 which is provided with a washer 29 to provide an air-tight joint. This fitting 28 receives the end 30 of the pipe 12 the opposite end 31 of which is in communication with the opening 32 (see Fig. 3) in the top of the unloader B.

Referring again to the check valve it will be seen that the plug 15 is provided with a screen 33 which surrounds the plug and covers the horizontal inlet 17 and thereby prevents dirt or any other foreign substance being delivered past the check valve plunger 25 to ultimately find its way to the air tank or the unloader.

Describing the unloader in detail, reference being had particularly to Fig. 3 in which this portion of the unit is shown in section, it will be clearly seen that the air enters the inlet port 32 the bottom of which is in communication with the channel 33 which terminates in the enlarged circular chamber 34. A felt packing 35 is carried in this chamber and positioned against the end of the channel 33 so that any air passing into the chamber 34 must pass through the felt which will prevent any dirt reaching the diaphragm 36 carried in the outer end of the chamber. Screw-threadedly attached to the outer face of the surrounding wall of the chamber 34, as at 37, is a hollow plug 38 in the outer end of which is mounted an adjusting screw or plug 39 which engages the internal screw threads 40 of the hollow plug 38. It will be seen that there is also a plunger 41 in the hollow plug and this plunger carries a ball 42 between which and the adjusting plug or screw 39 is positioned a coil spring 43. The plunger 41 rests squarely against the diaphragm 36 and holds the diaphragm against the outer end of the channel 44 thereby closing the same. A coil spring 45 is positioned between the diaphragm 36 and the felt 35 so that the diaphragm is in reality mounted between two coil springs 43 and 45. To assure that the plunger 41 will always rest squarely against the diaphragm the plunger is provided with a small seat or socket 46 in which the ball 42 rests.

From the foregoing it will be seen that by turning the adjusting plug or screw 39 in or out the spring tension upon the diaphragm can be adjusted as desired. When the tension has been properly adjusted the adjusting screw is held in fixed position by the lock nut 47.

The inner end of the channel 44 is in communication with the central chamber 48 which has an open lower end which is in communication with the hollow circular chamber 49 the lower end of which is externally screw-threaded as 50 by means of which the unloader B is fastened in the upper flared or bell-shaped end 51 of the pressure chamber D. Mounted within the circular chamber 49 is a sleeve 52 which is provided at its lower end with a circumferential flange 53 which abuts the internal shoulder 54 of the chamber. Slidably mounted in the chamber 49 is a plunger cylinder 55 into which extends the upper end of the plunger rod 56 which is provided with an enlarged head 57. The lower end of the chamber 49 is closed by an adjusting plug 58. A coil spring 59 surrounds the plunger 56 and has its lower end bearing against the inner face of the adjusting plug while its opposite end bears against the lower face of the enlarged head 57 of the plunger rod to normally hold the plunger piston 55 upwardly against the lower end of the chamber 48. It will be readily seen that the tension of the spring 59 can be adjusted through the medium of the adjusting plug 58.

To hold the unloader B in locked position upon the upper end of the pressure chamber D the unloader is provided with a lock nut 60.

It will be seen that the plunger 56 is of a length to extend well downwardly through the adjusting plug 58 and into the chamber 61 formed by the upper flared end of the pressure chamber D.

Attention is also directed to the fact that the diaphragm 36 is held firmly in place by a stiffening ring 62.

At the opposite side of the unloader from the diaphragm there is a needle valve 63 which controls the communication between the channel 64, which has communication with the inlet 32, and the short channel 65 which has communication with the central chamber 48 at the opposite side from the channel 44. By this construction air can be admitted to operate the cylinder plunger 55 by merely opening the needle valve thereby temporarily discarding the operation of the diaphragm control opening 44 leading to the plunger piston. In normal operation however the needle valve 63 is closed, as shown in Figure 3 of the drawings.

Referring to Figure 2 of the drawings and describing the pressure chamber D in detail it will be seen that this chamber has an opening 66 the upper end of which is in communication with the chamber 61 in the flared upper end of the casting. The lower end of the pressure chamber is closed by the safety valve C which has a plug portion 67 internally screw-threaded into the chamber. The plug portion of the safety valve is provided with an upwardly extending hollow cylinder 68 the upper end of which is adjacent the opening 66 in the upper end of the pressure chamber. Mounted within the cylinder 68 is a coil spring 69 which holds the ball 70 normally against the opening 66 to close the same.

It will be seen that the chamber 61 in the flared upper end of the pressure chamber casting is provided with an outlet opening 71.

As the safety valve C is closely associated with the pressure chamber D a detailed description of this portion of the unit is closely linked with the detailed description of the pressure chamber.

Continuing the description it will be seen that communication is had between the pressure chamber D and the interior of the cylinder 68 by means of the small orifices 72 positioned around the lower end of this cylinder. It will also be readily apparent from Figure 2 of the drawings that the ball 70 in addition to closing the opening 66 likewise closes the upper end of the cylinder 68. The hollow interior of the cylinder 68 has its lower end in communication, through the medium of the channel 73 with the interior 74 of the relief valve C. The relief valve chamber 74 is provided in its lower end with the adjusting plug 75 which engages the internal screw threads 76 in the lower end of the chamber. The adjusting plug 75 is provided with a central channel 77 the outer end of which is open to the atmosphere while the inner end is in communication with the relief valve chamber 74. Mounted in the chamber 74 there is a coil spring 78 the lower end of which is seated within the adjusting plug 75 as at 79 while the upper end of the spring carries a ball 80 which is held normally against the tapered portion 81 of the channel 73 normally closing the communication between the pressure chamber D and the relief valve chamber 74.

The tension of the relief valve spring 78 is readily adjusted by means of the adjusting plug 75 which is held in locked adjusted position by means of the lock nut 82.

As has been previously described, the pressure chamber D is in constant communication with the check valve chamber 14 by reason of the pipe 13 which joins these two portions of the entire unit. The inlet opening to the pressure chamber D with which the pipe 13 communicates clearly appears in Figure 1 of the drawings and is indicated by the numeral 83.

*Description.*

Describing the operation of the unit attention is again directed to the fact that it is mounted in the air line between the compressor and the storage tank.

The air being compressed by the compressor enters the chamber 14 of the check valve through the inlet 10 and passes through the screen 13 into the channel 17 and up the vertical passage 18. The air then continues upwardly through the opening 27, lifting the check plunger 25 and passes outwardly through the outlet opening 11 to the storage tank.

Attention is directed to the fact that the back pressure in the storage tank is constantly in the chamber 24 above the check valve plunger and is working against the enlarged head 26 of the plunger to hold the same down and thus close the opening 27 and preventing the pressure built up in the storage tank from escaping. It will also be seen that the storage tank pressure by reason of being constantly in the chamber 24, is also constantly working against the diaphragm 36 of the unloader by reason of the fact that the pipe 12 joins the chamber 24 with the channel 33 of the unloader.

The pressure being generated by the compressor in addition to passing to the storage tank passes downwardly from the check valve chamber 14 through the pipe 13 which delivers the compressor air pressure to the pressure chamber D where it is prevented from escaping by reason of the ball valves 70 and 80 held against their respective seats by reason of the coil springs 69 and 78.

It will of course be readily understood that the compressor is being continuously driven and that the device is primarily for the purpose of preventing a storage tank from exploding through having too great a pressure built up in it.

It will be assumed that it is desired to limit the storage tank pressure to one thousand pounds. The spring 43 in the unloader B will therefore be set to hold the diaphragm 36 against one thousand pounds pressure. When this amount of pressure has been built up in the storage tank the pressure will operate to move the diaphragm 36 outwardly against the pressure of the spring 43 and thereby permit the air to pass under the diaphragm, through the channel 44 and into the central chamber 48 of the unloader. The air pressure having entered the central chamber 48 will depress the plunger piston 55 against the tension of the coil spring 59. In its downward movement the plunger piston 55 will push the plunger rod 56 downwardly until the lower end of the plunger rod engages the ball 70 and unseats the same downwardly against the tension of the coil spring 69.

Immediately that this action takes place no more air will be delivered to the storage tank. The air being furnished by the compressor will follow the course of least resistance and instead of passing upwardly and lifting the check valve against the one thousand pounds of the storage tank it will pass downwardly through the channels 23 and into the pipe 13 to the pressure chamber from whence it will pass upwardly by the unseated ball 70 and into the chamber 61 in the upper bell-shaped end of the pressure chamber casting. The air pressure can then escape freely to the atmosphere through the outlet opening 71.

At this point it is desired to point out that to make the operation of the device silent there will preferably be attached to the outlet opening 71 a suitable form of muffler (not shown) so that the air escape will not make an objectionable noise.

As soon as the pressure in the tank falls, for any reason, the spring 43 will function to close the diaphragm against the channel 44 and the spring 69 will then lift the ball valve 70 again to a closed position so that the air delivery from the compressor will again go to the tank until the desired pressure therein has been reached.

To safeguard the tank, in the event that the unloader should not operate for any reason, the relief valve C is provided.

It will be readily understood that the pressure in the chamber 14 of the check valve must reach an amount equal to that in the storage tank to lift the check valve plunger 25 against the back pressure in the tank. It can therefore be said that the pressure in the chamber 14 is equal to the pressure in the tank and as the chamber 14 is in communication with the pressure chamber D the pressure in this chamber is approximately the same as the pressure in the storage tank. Therefore should the unloader fail to operate to unseat the ball valve 70 the pressure in the pressure chamber D will operate to unseat the ball valve 80 against the tension of the spring 78, the pressure finding its way downwardly from the pressure chamber by reason of the orifices 72 and the opening 73 into the relief valve.

The tension of the spring 78 of the relief valve will be set however not to operate until the pressure in the pressure chamber D has reached an amount well above the one thousand pounds to which the device is set. This is done so that the relief valve will not operate at any time until the automatic unloader should fail to operate. In the event that the relief valve comes into operation the air pressure will escape to atmosphere through the opening 77 in the adjusting plug 75 in the lower end of the relief valve housing.

From the foregoing it will be seen that there is provided in one device or one unit a check valve, an automatic unloader and an automatic relief valve which can be positioned at any place in the air line between a compressor and a storage tank so as to operate to safe-guard the storage tank against being blown up by the building up of an excessive air pressure. Furthermore it will be seen that when the pressure in the storage tank falls and thereby permits the spring 69 to close the ball valve 70 the compressor will start against zero pressure in the check valve chamber 14. The starting of the compressor against zero pressure is important and is very desirable.

If for any reason it is desired to operate the unloader before it is automatically operated by the pressure in the storage tank this can be accomplished by opening the needle valve 63 and allowing the storage tank pressure to pass to the central chamber 48 in the unloader through the supplemental channel 64, so that the plunger piston 55 will be operated to open the ball valve 70 and thereby remove all the load from the compressor. The operation of the device in this manner might be desirable for instance when first starting without waiting for the full set pressure of the automatic unloader to be operated by the pressure in the storage tank.

Attention is directed further to the fact that by reason of the manner in which the several parts of the unit are assembled and mounted any portion of the unit can be removed and cleaned when desired.

Attention is directed to the fact that the plunger cylinder 44 in the chamber 49 is provided with an opening in its top which is closed by a screw 84. This screw is notched through its threads and head so as to act as a bleeder to allow the escape of air below the plunger cylinder to permit the plunger to return to its upper position when the pressure in the storage tank drops sufficiently to allow the diaphragm to seat.

The unloader B is provided with a shoulder 85 above the lock nut 60. In practice the unloader B is screwed into the upper end of the auxiliary pressure chamber D until the lock nut is pinched between the shoulder and the enlarged end 51 of the pressure chamber. If the unloader is not then in the proper position for the plunger 56 to operate the ball valve 66 the unloader can be backed up a portion of a turn to the desired location and the lock nut then drawn tightly against the end of the pressure chamber and thereby act as a jam nut to hold the unloader properly located.

In a device of this character it is highly desirable that it operate within a range of about two pounds. That is to say, if the unloader were set to permit the diaphragm to be unseated at one hundred pounds pressure the diaphragm would reseat itself if the pressure were to drop to ninety-eight pounds. The present invention will operate within a range of approximately two pounds.

Having thus described my invention what I claim and desire to secure by Letters Patent is:—

1. An unloader assembly adapted for use in an air line between a compressor and its storage tank comprising a check valve, an unloader, and a relief valve, the parts arranged whereby the unloader operates at a predetermined pressure in the storage tank the air being compressed by the compressor and insures the compressor starting against zero pressure when the unloader operates to again permit the delivery of air to the storage tank.

2. An unloader assembly adapted for use in an air line between a compressor and its storage tank comprising a check valve, a pressure chamber, an unloader mounted above said pressure chamber and a relief valve positioned below said pressure chamber, valves normally closing communication of the pressure chamber with the unloader and the relief valve, an outlet to atmosphere intermediate the pressure chamber and the unloader, communication between the pressure chamber and the air line in front of the check valve, and means comprising a part of the unloader adapted to open communication between the pressure chamber and the outlet to atmosphere when the pressure in the storage tank reaches a predetermined amount.

3. An unloader assembly adapted for use in an air line between a compressor and a storage tank, comprising a housing carrying a check valve, an unloader, a relief valve, a pressure chamber, said pressure chamber having an upper end open to the atmosphere, the unloader mounted in the said upper end of the pressure chamber and the relief valve mounted below the pressure chamber, valves normally closing the pressure chamber from communication with the relief valve and the upper end of the chamber having communication with the atmosphere, communication between the unloader and the relief valve housing, said communication being in back of the relief valve, communication between the pressure chamber and the relief valve housing in front of the relief valve, means comprising a portion of the unloader for opening communication between the pressure chamber and the atmosphere when the pressure in the tank reaches a predetermined amount, and means to close said communication when the pressure in the storage tank is less than the predetermined amount.

In testimony whereof I hereunto affix my signature.

GEORGE EDGAR HAZARD.